United States Patent [19]

Kasai

[11] Patent Number: 5,221,168
[45] Date of Patent: Jun. 22, 1993

[54] DEVICE FOR FIXING EXTERNAL PART TO SHAFT

[75] Inventor: Makoto Kasai, Maebashi, Japan

[73] Assignee: Mitsuba Electric Manufacturing Co., Ltd., Gunma, Japan

[21] Appl. No.: 717,930

[22] Filed: Jun. 20, 1991

[30] Foreign Application Priority Data

Jun. 22, 1990 [JP] Japan ............... 2-66670[U]

[51] Int. Cl.⁵ .................. F16B 39/10; F16B 39/00
[52] U.S. Cl. .................... 411/124; 411/131; 411/976
[58] Field of Search ........ 411/121, 123, 124, 131–135, 411/122, 226, 236, 976, 990, 190; 403/320

[56] References Cited

U.S. PATENT DOCUMENTS

| | | | |
|---|---|---|---|
| 2,147,787 | 2/1939 | Ferguson | 411/976 X |
| 3,447,342 | 6/1969 | Hein | 411/976 X |
| 4,787,791 | 11/1988 | Lambousy et al. | 411/122 X |
| 5,022,875 | 6/1991 | Karls | 411/131 X |

Primary Examiner—Neill R. Wilson
Attorney, Agent, or Firm—McGlew and Tuttle

[57] ABSTRACT

A device for fixing an external part to a shaft, which clam a boll and roller bearing by a washer and a nut. The washer is provided with a plurality of projecting engageable pawls on the outer periphery thereof and a projecting tongue piece on the inner periphery thereof. This tongue piece is inserted into an engageable groove formed in an externally threaded portion of the shaft. The nut has engageable grooves for receiving the engageable pawls of the washer, on the outer periphery thereof. This nut is threadably coupled onto the externally threaded portion of the shaft, thereby the ball and roller bearing is clamped interposing the washer between the bearing and the nut. The tongue piece of the washer is formed in such a manner that, out of the opposite ends in the circumferential direction of the tongue piece, at least the forward end in a direction of rotation of fastening the nut is positioned on the center line or thereabout of the engageable pawl. The shaft may be a hollow shaft.

17 Claims, 5 Drawing Sheets

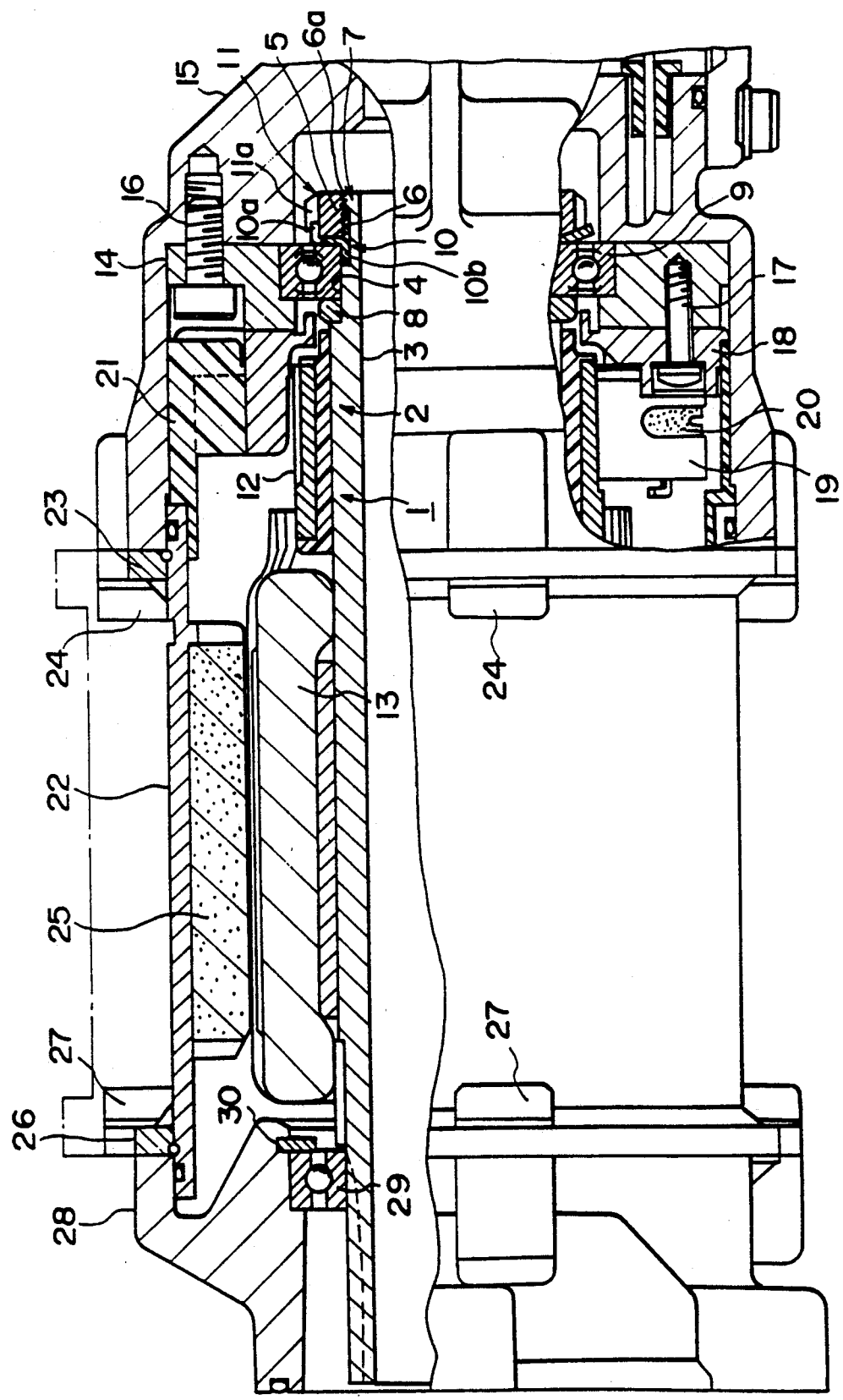

DEVICE FOR FIXING EXTERNAL PART TO SHAFT

FIELD OF THE INVENTION

The present invention relates to a device for fixing an external part onto a shaft, and more particularly to a device having a construction in which an external part is clamped to an end portion of a shaft by a washer and a nut, and for example, to one effectively used for fixing a ball and roller bearing to a rotary shaft of a motor.

RELATED ART STATEMENT

In general, when the ball and roller bearing is externally fixed to the rotary shaft (hereinafter referred to as "shaft") of the motor, an externally threaded portion is formed on the outer periphery of an opening portion at an end of a main body of the shaft, and a nut is threadably coupled to this externally threaded portion, to thereby clamp the ball and roller bearing.

As described above, when a ball and roller bearing is clamped to the end portion of the shaft by the nut threadably coupled to the externally threaded portion of the shaft, in order to prevent a phenomenon of spontaneous loosening of the nut, there is used a device for fixing an external part to be mounted on the shaft, which comprises a washer for a ball and roller bearing (hereinafter referred to as a "washer for a bearing") formed in an annular shape and provided with a plurality of projecting engageable pawls on the outer periphery thereof and a projecting tongue piece on the inner periphery thereof, and a nut formed with an engageable groove for receiving the engageable pawl of the washer on the outer periphery thereof.

Namely, the engageable grooves are cuttingly provided on the outer peripheries of the externally threaded portion of the shaft and of the nut in the axial direction respectively. The ball and roller bearing is coupled to the shaft, and thereafter, the tongue piece of the washer for the bearing is inserted into the engageable groove, to thereby be coupled to the externally threaded portion. Next, the nut is threadably coupled onto the externally threaded portion, whereby the ball and roller bearing is clamped by the nut, interposing therebetween the washer for the bearing. Subsequently, the engageable pawl of the washer is engaged with the engageable groove of the nut. In this state, the nut is locked against rotating about the shaft via the washer for the bearing, so that the nut is reliably prevented from being loosened.

However, in the conventional device for fixing the external part to the shaft, as shown in FIG. 6, the center line of a tongue piece 10b' of a washer for a bearing 10' coincides with the center line C of an engageable pawl 10'a and the tongue piece 10'b is inserted into an engageable groove 6', so that, at the time of fastening the nut, the washer is broken at the forward end of the tongue piece 10'b in a direction of rotation of fastening, because there is sliding resistance between surfaces of the nut and the washer opposed to each other, thus unabling to obtain a desired strength of clamping.

An object of the present invention is to provide a device for fixing an external part to a shaft, wherein breakage of a washer for preventing the nut from being loosened is avoided when the nut is fastened, and the clamping strength is high.

SUMMARY OF THE INVENTION

A device for fixing an external part of a shaft according to the present invention, wherein:
there are provided
a washer formed into an annular shape and having a plurality of projecting engageable pawls on the outer periphery thereof and a projecting tongue piece formed on the inner periphery thereof; and
a nut formed with an engageable groove, for receiving the engageable pawl of the washer, on the outer periphery thereof; and
the washer is coupled onto an externally threaded portion of the shaft, on which an article is externally mounted, in a state where the tongue piece is inserted into an engageable groove in the externally threaded portion,
the nut is threadably coupled to the externally threaded portion, whereby the article is clamped to the shaft, interposing the washer between the article and the nut, and
the engageable pawl of the washer is inserted into the engageable groove of the nut;
is characterized in that:
the tongue piece of the washer is formed in such a manner that, out of the opposite ends in the circumferential direction of the tongue piece, at least a forward end in a direction of rotation of fastening the nut is positioned on the center line or thereabout of one of the engageable pawls.

According to the above-described means, the position of the tongue piece of the washer is shifted from the position of the engageable pawls, whereby a sectional area at the forward end in a direction of rotation of fastening is increased, so that the strength at the said position is increased, thus resulting in that occurence of deformation and breakage of the washer can be prevented. Consequently, the fastening torque for the nut can be strengthened with the result the external part can be reliably fixed to the shaft.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a partially cutaway side view showing a motor using a hollow shaft;

DETAILED DESCRIPTION OF THE PREFERRED EMBODIMENTS

Figure 1:
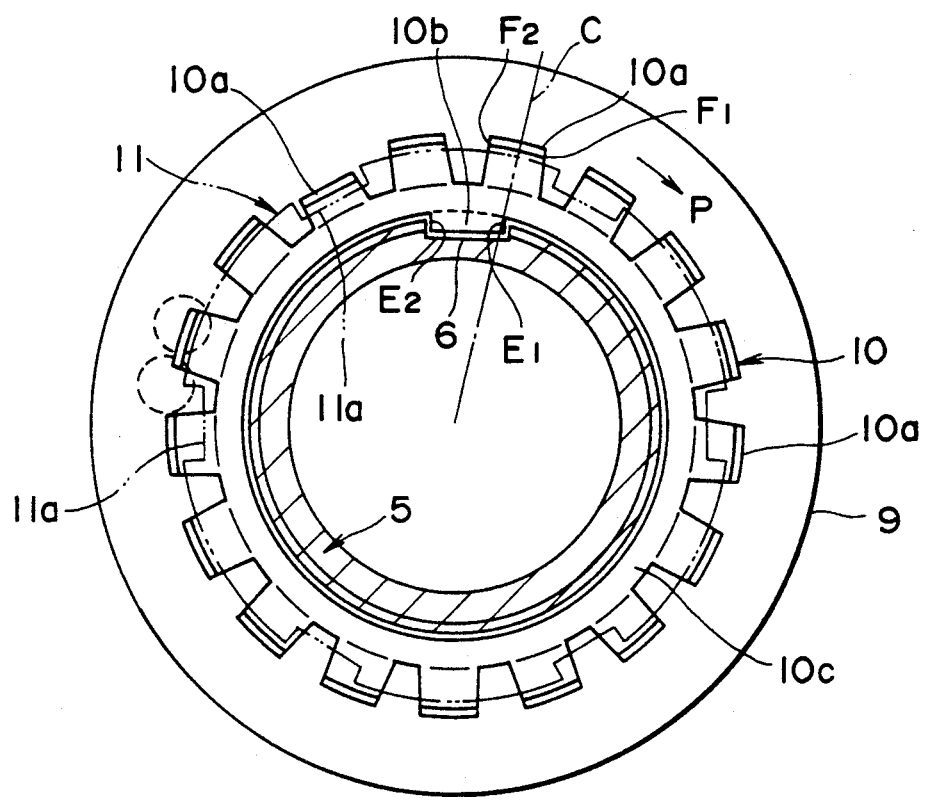
FIG. 1 is an enlarged partial side view showing one embodiment of the device for fixing an external part to a shaft, according to the present invention.
Figure 2:
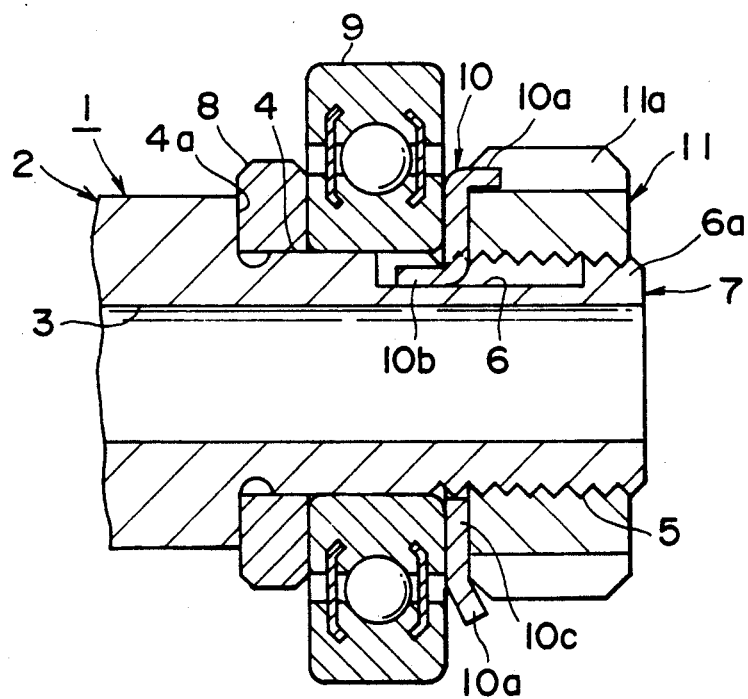
FIG. 2 is an enlarged partial side sectional view thereof.
Figure 3A:
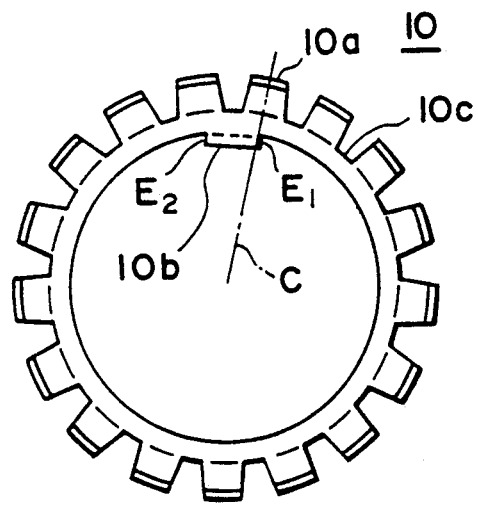
FIGS. 3(a) and 3(b) are a frontal view and a side sectional view showing a washer for a bearing.
Figure 3B:
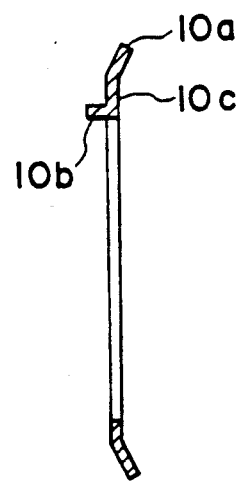
Figure 4A:
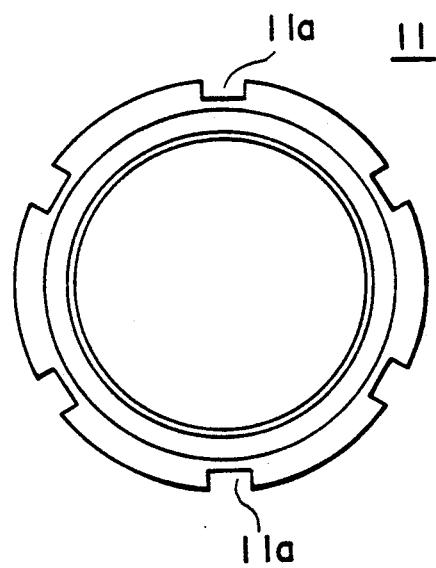
FIGS. 4(a) and 4(b) are a frontal view and a side sectional view showing a nut.
Figure 4B:
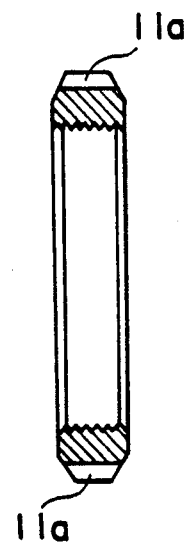
Figure 6:
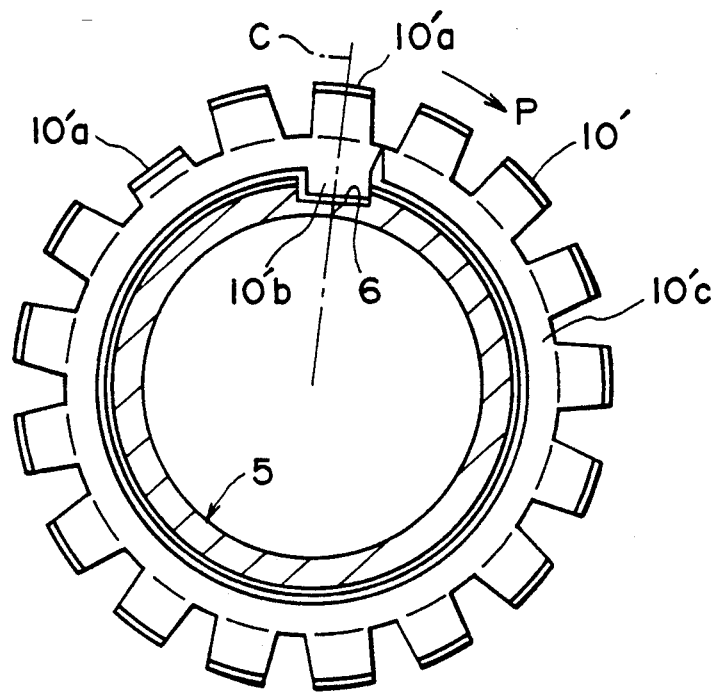
FIG. 6 is an enlarged partial side sectional view showing a comparative example.

FIG. 1 is an enlarged partial front sectional view showing an embodiment of the device for fixing an external part to a shaft, according to the present invention, FIG. 2 is an enlarged partial side sectional view thereof, FIG. 3(a) and 3(b) are a frontal view and a side sectional view showing a washer for a bearing, FIG. 4(a) and 4(b) are a frontal view and a side sectional view showing a nut, and FIG. 5 is a partially cutaway side view showing a motor using a hollow shaft.

In this embodiment, the device for fixing an external part to the shaft is used for fixing the ball and roller bearing 9 as being the external part to a motor shaft 1 of a motor. In this embodiment, the motor shaft 1, as being a shaft to which the ball and roller bearing 9 is fixed, is formed in a hollow shape. Namely, the hollow shaft 1 as being the motor shaft has a main body 2 in a cylindrical form, and a hollow portion 3 of the cylinder is inserted therethrough with a rack shaft, not shown. A mounting portion 4 has a small diameter with predetermined width and depth and is formed on the outer periphery of an end portion of the main body 2 of the hollow shaft. An externally threaded portion 5 is notchingly provided in an outer portion in the axial direction of the mounting portion 4.

Figure 7:
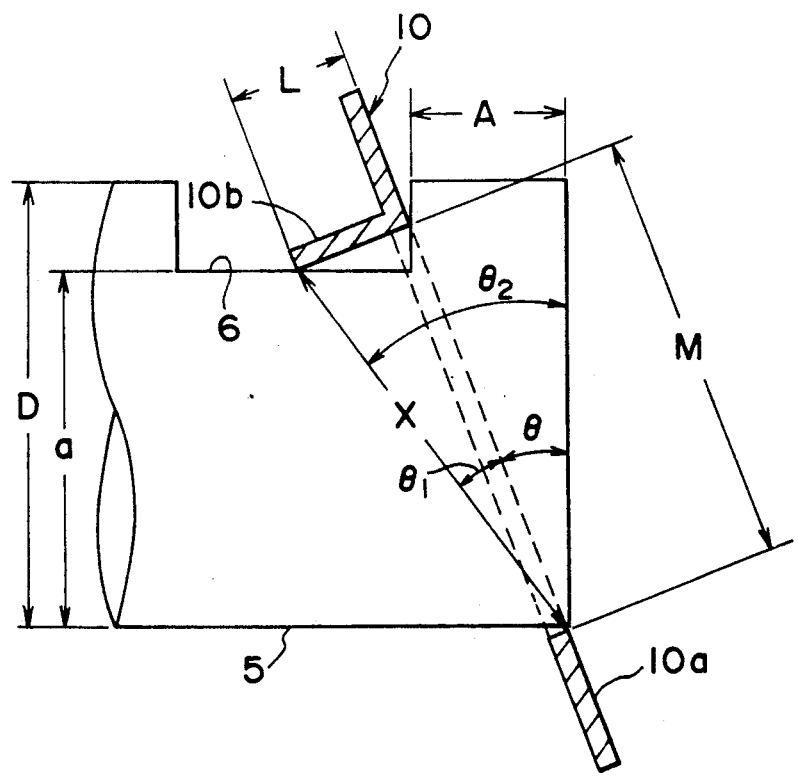
FIG. 7 is an enlarged partial side sectional view showing work of assembling the washer for the bearing.

Furthermore, in a portion in the circumferential direction of the mounting portion 4, there is recessedly provided an engageable groove 6 having predetermined width and depth, and for engaging a tongue piece 10b of a washer 10 for a bearing. This washer 10 will be described later. In other words, the engageable groove 6 is cuttingly provided extending to the intermediate portion of the externally threaded portion 5, and a remaining wall portion 6a is formed at an outer end portion of the externally threaded portion 5. Accordingly, at an outer end portion in the axial direction of the externally threaded portion 5 of the main body 2 of the hollow shaft, a reinforcing ring portion 7 having predetermined width and thickness is formed concentrically therewith and integrally projected therefrom. The thickness of the remaining wall portion 6a in the engageable groove 6, i.e. the thickness of the reinforcing ring portion 7 is preferably as large as possible from the view point of improving the strength, however, when the thickness exceeds a predetermined value, the washer 10 for the bearing cannot be mounted to the externally threaded portion 5. Therefore, as shown in FIG. 7, the thickness A of the remaining wall portion 6a is set at a value satisfying an equation (5) which is sought as follows.

$$X = \sqrt{L^2 + M^2} \quad (1)$$

$$\cos\theta_1 = \frac{M}{X} = \frac{M}{\sqrt{L^2 + M^2}} \quad (2)$$

$$\therefore \theta_1 = \cos^{-1}\frac{M}{\sqrt{L^2 + M^2}}$$

$$\cos\theta_2 = \frac{a}{X} = \frac{a}{\sqrt{L^2 + M^2}}$$

$$\therefore \theta_2 = \cos^{-1}\frac{a}{\sqrt{L^2 + M^2}}$$

$$\theta = \theta_2 - \theta_1 \quad (4)$$

$$= \cos^{-1}\frac{a}{\sqrt{L^2 + M^2}} - \cos^{-1}\frac{M}{\sqrt{L^2 + M^2}}$$

$$A = <M\sin\theta \quad (5)$$

$$= M\sin\left(\cos^{-1}\frac{a}{\sqrt{L^2 + M^2}} - \cos^{-1}\frac{M}{\sqrt{L^2 + M^2}}\right)$$

$$d = D + 0.1 \sim 2 \text{ (mm)} \quad (6)$$
$$M = d - 1 \sim 2 \text{ (mm)} \quad (7)$$

where
- M: a value obtained by subtracting a length or extension distance in the radial direction of a tongue piece 10b from the internal diameter d of the shaft opening of the washer 10 for the bearing,
- L: a or width length in the axial direction of the tongue piece 10b, and
- a: a value obtained by substracting the depth of the engageable groove 6 from the diameter D of the externally threaded portion 5.

A ball and roller bearing 9 is assembled onto and fixed as will be described hereunder to the hollow shaft 1 thus constructed, by use of the washer 10 and the nut constructed in the following manner.

As shown in FIG. 3, in this device for fixing the external part to the shaft, the washer 10 for the bearing has a main body 10c formed in an annular shape, and has a plurality of engageable pawls 10a are arranged at equal intervals in a circumferential direction. The pawls 10a projected outwardly in a normal direction to a plane of the washer 10, on the outer periphery of this main body 10c. These engageable pawls 10a are suitably flexed and engaged with an engageable groove 11a to be described hereunder.

Furthermore, a tongue piece 10b is projected inwardly in the normal direction on the inner periphery of the main body 10c and bent at a right angle to the axial direction. This tongue piece 10b is formed to be engageable with the engageable groove 6 of the aforesaid externally threaded portion 5. Then, in this embodiment, out of the opposite ends $E_1$ and $E_2$ in the circumferential direction of this tongue piece 10b, at least one end $E_1$ positioned at the forward end in the direction of rotation of fastening of the nut is positioned on the center line C of one of the engageable pawls 10a.

On the other hand, as shown in FIG. 4, a plurality of engageable grooves 11a are arranged at equal intervals in the circumferential direction and directed inwardly in the normal direction on the outer periphery of the nut 11 as being a counterpart of the washer 10 for the bearing, and each of the engageable grooves 11a is formed for receiving the engageable pawl 10a of the washer 10 for the bearing.

The work of assembling the ball and roller bearing 9 as being the external part to the hollow shaft 1 will hereunder be described.

First, a distance ring 8 is coupled onto the mounting portion 4 as far as it abuts against, or positioned adjacent, a stepped portion 4a of the mounting portion 4. Subsequently, the ball and roller bearing 9 is coupled onto the mounting portion 4 as far as it abuts against the distance ring 8.

Next, the washer 10 for the bearing as shown in FIG. 3 is coupled onto the mounting portion 4 as far as it abut against the ball and roller bearing 9. At this time, the tongue piece 10b, which is bent substantially at a right angle toward the bearing in the axial direction on the inner periphery of the washer 10 for the bearing, is to be inserted into the engageable groove 6 of the mounting portion 4. As shown in FIG. 7, the tongue piece 10b is inserted into the engageable groove 6 in a state where the washer 10 for the bearing is inclined to the axial line, because the remaining wall portion 6a is formed at the forward end portion of the engageable groove 6, and thereby the engageable groove 6 is blocked. In this case, since the thickness A of the remaining wall portion 6a is set to satisfy the aforesaid equation (5), the washer 10 for the bearing can pass through the externally threaded portion 5 in a posture of being inclined. The insertion of the tongue piece 10b into the engageable groove 6 locks the washer 10 for the bearing against rotating about the hollow shaft 1.

Subsequently, the nut 11 is threadably coupled to the externally threaded portion 5 of the hollow shaft 1, and the ball and roller bearing 9 coupled to the mounting portion 4 from outside is clamped by the stepped portion 4a of the mounting portion 4 and the nut 11 via the distance ring 8 and the washer 10 for the bearing. When the ball and roller bearing 9 is completely fixed, one of a plurality of engageable pawls 10a arranged at equal intervals in the circumferential direction and radially projecting from the outer periphery of the washer 10 for the bearing is flexed and deformed so as to be inserted into one of the engageable grooves 11a arranged at intervals in the circumferential direction and recessedly provided inwardly in the radial direction on the outer periphery of the nut 11 as shown in FIG. 2. The engagement of the engageable pawl 10a with the engageable groove 11a locks the nut 11 against rotating about the hollow shaft 1 via the washer 10 for the bearing, so that the nut 11 can be prevented from being loosened due to the rotation of the hollow shaft 1.

In this state where the engageable pawl 10a of the washer 10 for the bearing is engaged with the engageable groove 11a of the nut 11 as described above, the strength of the washer 10 for the bearing against the tangential force (tensile force) P due to the resistance between the opposing surfaces of the nut 11 and the washer 10 when the clamping tongue of the nut 11 is applied, is improved as compared with the conventional example. This is because, in the conventional example, the tangential force P is received by a main body 10', whereas, in this embodiment, the tangential force P is received by the main body 10c and the engageable pawl 10a, whereby stress in this embodiment is lower.

When the end $E_1$ in the circumferential direction of the tongue piece 10b is positioned in the proximal end of the engageable pawl 10a, breakage occurs between the proximal end of the end $E_1$ in the circumferential direction and either one of proximal ends of the end $F_1$ and the end $F_2$ in the circumferential direction of the engageable pawl 10a, which is closer. Therefore, when the end $E_1$ in the circumferential direction of the tongue piece 10b is positioned on the center line C of the engageable pawl 10a, the strength becomes highest. Therefore, the end $E_1$ is preferably positioned on the center line C or in the vicinity thereof.

As described above, according to this embodiment, the strength of the washer 10 for the bearing is increased, so that the fastening torque for the nut 11 can be raised, thus resulting in that the ball and roller bearing can be fixed reliably and the nut 11 itself can be reliably prevented from being loosened.

Furthermore, the washer 10 for the bearing can be improved without relying on the methods of changing the material quality of the washer 10 for the bearing and without increasing a plate thickness, both leading to the increase in costs, so that the increase in costs can be suppressed.

Figure 8:
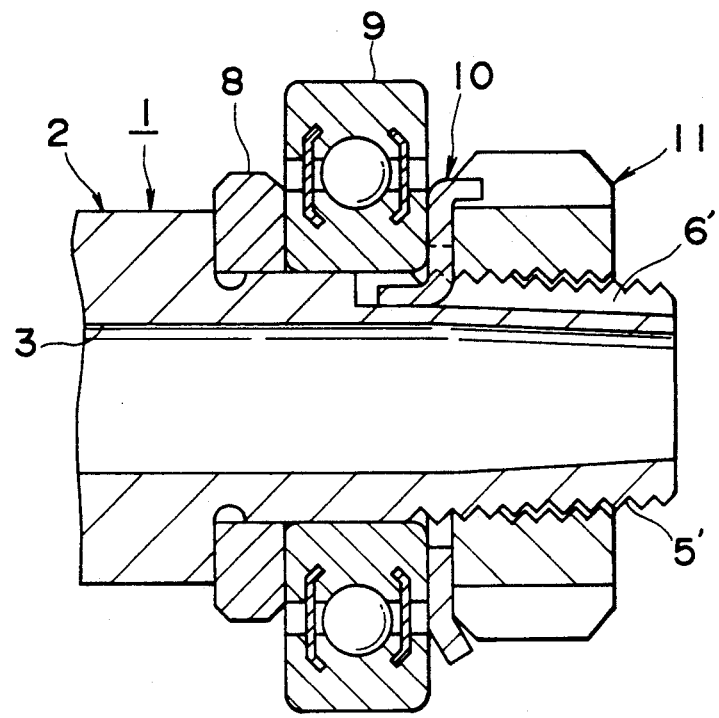
FIG. 8 is an enlarged partial side sectional view showing another comparative example.
Figure 9:
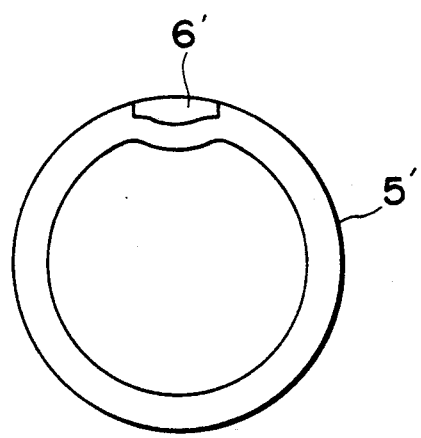
FIG. 9 is a partial end surface view thereof.

Now, in the conventional example where the reinforcing ring portion 7 is not formed on the hollow shaft 1, namely, in the case where an engageable groove 6' is cuttingly provided to be open at the forward end of an externally threaded portion 5' as shown in FIG. 8, when the nut 11 is strongly fastened, stress is concentrated at the engageable groove 6', whereby the engageable groove 6' portion is deformed as shown in FIG. 9, so that the externally threaded portion 6' is taperedly reduced in diameter and deformed, namely, a so-called shrinking phenomenon occurs. When the externally threaded portion 5 is taperedly reduced in diameter, screw threads of the externally threaded portion 5 and of the nut 11 do not properly mesh with each other, so that clamping of the ball and roller bearing 9 by the nut 11 becomes improper.

However, in the above-described embodiment according to the present invention, the remaining wall portion 6a is formed at the outer end portion of the engageable groove 6, whereby the reinforcing ring portion 7 is integrally formed on the outer end portion in the axial direction of the externally threaded portion 5 of the hollow shaft 1, so that the nut 11 can be fastened strongly. Even when a force for deforming the externally threaded portion 5 inwardly in the radial direction acts on the forward end portion of the externally threaded portion 5, the acting force is sustained by the reinforcing ring portion 7, so that the externally threaded portion 5 can be prevented from being taperedly reduced in diameter.

As described above, in this embodiment, the reduction in diameter and deformation of the externally threaded portion at the time of being clamped by the nut 11 of the ball and roller bearing 9 is avoided, whereby, even when the nut 11 is fastened strongly, the engagement of the screw threads of the externally threaded portion 5 and of the nut 11 remains in the proper state. As the result, combined with the effect of increase strength of the washer 10 for the bearing, the ball and roller bearing 9 can be strongly clamped, so that the ball and roller bearing 9 can be reliably fixed to the hollow shaft 1.

In this embodiment, fixedly mounted on the outer periphery of the intermediate portion of the hollow shaft 1 as being a motor shaft, are a commutator 12 and an armature 13 successively arranged space from the side of the mounting portion 4 and integrally rotatable. The ball and roller bearing 9 is clamped by the nut 11 in the above-described work on the mounting portion 4 of the hollow shaft 1 to which the commutator 12 and the armature 13 are mounted. At this time, a bearing holder 14 is fixedly mounted on the ball and roller bearing 9 by being pressed onto the outer periphery of an outer race thereof.

Then, the hollow shaft 1 is inserted into one of end brackets constituting a portion of a motor housing from the side of the bearing holder 14 in a state where the ball and roller bearing 9, the bearing holder 14, the commutator 12 and the armature 13 are fixedly mounted to the shaft 1. Subsequently, bolts 16 are inserted through the bearing holder 14, whereby the hollow shaft 1 is assembled to the end bracket 15 in a state of being positioned in place.

Subsequently, a brush holder stay 18 is inserted into the end bracket 15 in a state of being coupled onto the hollow shaft 1, and secured to the bearing holder 14 by bolts 17. Fixedly mounted on this brush holder stay 18 is a brush holder 19 which holds brushes 20 being in sliding contact with the commutator 12 fixedly mounted on the hollow shaft 1. Coupled onto the outer periphery of the brush holder stay 18 is a resinous cover 21, by which the exteriors of the brush holder stay 18 and the brush holder 19 are surrounded.

Furthermore, a yoke 22 constituting a portion of the motor housing covers an opening portion of the end bracket 15 in a state of being coupled onto the hollow shaft 1. The yoke 22 is secured to the end bracket 15 by bolts 24 at a flange portion 23 welded to the outer periphery at one end of the yoke. Fixedly mounted and arranged in the circumferential direction on the inner periphery of the yoke 22 are magnets 25 which are opposed to the armature 13 fixedly mounted on the hollow shaft 1.

Then, a second end bracket 28 covers an opening portion at the outer end of the yoke 22. A flange portion 26 welded to the outer periphery of the yoke 22 is secured to an end bracket 28 by bolts 27, whereby this end bracket 28 and the yoke 22 are connected to each other. Another ball and roller bearing 29 is coupled into this second end bracket 28 and held by a stopper ring 30 in a state of being positioned in place, and an end portion of the hollow shaft 1 is coupled into an inner race of the ball and roller bearing 29. With this arrangement, the hollow shaft 1 is rotatably supported by the ball and roller bearings 9 and 29 arranged in the both end brackets 15 and 28.

In the motor thus assembled and constructed, when electric power is supplied to the armature 13 through the brushes 20 and the commutator 12, the magnetic lines of force of the armature 13 cross the magnetic fields of the magnets 25, whereby the hollow shaft 1 is rotatably driven. By the inertial force of the rotation of this hollow shaft 1, the outer periphery of the mounting portion 4 of the hollow shaft 1 and the inner peripheral surface of the inner race of the ball and roller bearing 9 tend to be shifted relatively. However, as described above, the inner race of the ball and roller bearing 9 are strongly clamped to each other by the nut 11, so that the relative shift between the hollow shaft 1 and the inner race of the ball and roller bearing 9 can be reliably prevented.

Furthermore, loosening of the nut 11 due to the inertial force of the rotation of the hollow shaft can be prevented by the washer 10 for the bearing and the engageable groove 6 as described above.

Incidentally, the present invention should not necessarily be limited to the above embodiment, and, it is needless to say that various modifications are possible within the scope of the invention.

For example, in the above, description has been given of the case where the inner race of the ball and roller bearing 9 as being the external part is clamped onto the mounting portion 4 of the hollow shaft 1 by the nut 11, however, the present invention can be applied to the case where an external part such as a fan is clamped to the hollow or a solid shaft so as to be rotatable integrally, and so forth.

As has been described hereinabove, according to the present invention, even when the nut is threadably coupled to the externally threaded portion and is fastened strongly, the washer is prevented from being broken at the time of fastening because the strength of the washer is raised, with the result that the external part such as the ball and roller bearing or a fan can be reliably clamped to the shaft by the strong clamping force of the nut.

While specific embodiments of the invention have been shown and described in detail to illustrate the application of the principles of the invention, it will be understood that the invention may be embodied otherwise without departing from such principles.

What is claimed is:

1. A connection device comprising:
   a shaft including a first end having a groove in a substantially axial direction on an outside radial surface of said shaft, said first end also including external threads;
   a nut having internal thread means for engaging with said external threads of said shaft, said nut having an engageable groove; and
   a washer defining a shaft opening and said shaft opening having an internal diameter substantially similar to an external diameter of said shaft, said washer including a nut engagement means for engaging said washer with said nut, said nut engagement means including a pawl engageable with said engageable groove of said nut, said washer also including shaft engagement means for engaging said washer with said shaft, said shaft engagement means including a tongue engageable with said groove of said shaft, said tongue having a circumferential edge positioned substantially along a central line of said pawl of said washer.

2. A connection device in accordance with claim 1, wherein:
   said circumferential edge of said tongue is in a substantially radial direction and said central line of said pawl is also along said substantially radial direction.

3. A connection device in accordance with claim 1, wherein:
   said circumferential edge is leading said tongue in a direction of rotation of said shaft.

4. A connection device in accordance with claim 1, wherein:
   said pawl extends radially outward from said washer and said tongue extends radially into said shaft opening.

5. A connection device in accordance with claim 1, wherein:
   said shaft defines a mounting portion having a smaller diameter than a remainder of said shaft, and said internal diameter of said shaft opening of said washer is substantially similar to said smaller diameter of said mounting portion.

6. A connection device in accordance with claim 1, further comprising:
   a plurality of pawls; and
   said nut defines a plurality of engageable grooves.

7. A connection device in accordance with claim 6, wherein:
   said washer has a main body formed in an annular shape;
   said plurality of pawls are arranged at equal intervals in a circumferential direction and extend radially outwardly and in a normal direction to a plane of said washer; and said tongue is bent inwardly in the normal direction to said plane of said washer on an inner periphery of the main body.

8. A connection device in accordance with claim 7, wherein:
a plurality of said engageable grooves are arranged at equal intervals in the circumferential direction and directed radially inwardly on an outer periphery of said nut, and
each of the engageable grooves is for receiving one of the plurality of pawls of said washer.

9. A connection device in accordance with claim 1, further comprising:
an external part positioned on said shaft and clamped to said shaft by said nut, said washer being positioned between said nut and the external part.

10. A connection device in accordance with claim 6, wherein:
said tongue has another circumferential edge and both circumferential edges of said tongue are substantially aligned with center lines of different ones of said plurality of pawls.

11. A connection device in accordance with claim 1, wherein:
said shaft is hollow and includes a reinforcing ring at said first end, said reinforcing ring forming a wall portion defining an axial end of said groove of said shaft, said axial end of said groove being adjacent said first end of said shaft.

12. A connection device in accordance with claim 1, wherein:
said groove of said shaft is positioned among said external threads of said shaft.

13. A connection device in accordance with claim 11, wherein:
a width of said wall portion in an axial direction is predetermined to couple said washer onto said first end.

14. A connection device in accordance with claim 11, wherein:
a width of said wall portion, an external diameter of said reinforcing ring, said internal diameter of said shaft opening, and extension distance of said tongue into said shaft opening, a depth of said groove of said shaft, and a width of said tongue in an axial direction are chosen to couple said washer onto said first end of said shaft and engage said tongue into said groove of said shaft.

15. A connection device in accordance with claim 1, wherein:
said shaft is a motor shaft.

16. A connection device in accordance with claim 9, wherein:
said external part is one of a ball and roller bearing, and a fan.

17. A lock washer comprising:
a main body formed in an annular shape and defining a shaft opening;
a tongue extending from said main body into said shaft opening, said tongue having a circumferential edge; and
a pawl extending radially outward from said main body, said pawl having a center line positioned substantially in line with said circumferential edge of said tongue.

* * * * *